United States Patent
Shannahan (10) Patent No.: US 10,662,002 B2
(45) Date of Patent: May 26, 2020

(54) TIRE MANIPULATOR

(71) Applicant: Cynergy Ergonomics, Inc., St. Louis, MO (US)

(72) Inventor: Mike Shannahan, Ballwin, MO (US)

(73) Assignee: Cynergy Ergonomics, Inc., St. Louis, MO (US)

(*) Notice: Subject to any disclaimer, the term of this patent is extended or adjusted under 35 U.S.C. 154(b) by 0 days.

(21) Appl. No.: 16/220,483

(22) Filed: Dec. 14, 2018

(65) Prior Publication Data

US 2019/0193954 A1 Jun. 27, 2019

Related U.S. Application Data

(60) Provisional application No. 62/610,421, filed on Dec. 26, 2017.

(51) Int. Cl.
| | |
|---|---|
| *B65G 47/91* | (2006.01) |
| *B66F 9/18* | (2006.01) |
| *B66C 1/54* | (2006.01) |
| *B65G 57/24* | (2006.01) |

(52) U.S. Cl.
CPC ......... *B65G 47/917* (2013.01); *B65G 47/914* (2013.01); *B66C 1/54* (2013.01); *B66F 9/185* (2013.01); *B65G 57/24* (2013.01); *B65G 2201/0273* (2013.01)

(58) Field of Classification Search
CPC .... B65G 47/917; B65G 47/914; B65G 57/24; B65G 2201/0273; B66C 1/54; B66F 9/185

USPC ............................................................ 294/93
See application file for complete search history.

(56) References Cited

U.S. PATENT DOCUMENTS

| | | | | |
|---|---|---|---|---|
| 6,354,644 | B1* | 3/2002 | Zaguroli, Jr. ........ | B65H 19/123 294/67.22 |
| 6,592,321 | B2* | 7/2003 | Bonker .................... | B66C 13/56 212/285 |
| 6,604,704 | B2* | 8/2003 | Kiprowski ........... | B65H 3/0816 242/559 |
| 6,615,649 | B1* | 9/2003 | Kokubu ............. | B29D 30/0016 157/1.17 |
| 6,648,580 | B2* | 11/2003 | Lofgren ................ | B21C 47/242 414/607 |
| 6,733,058 | B1* | 5/2004 | Nakajima ............ | B65H 19/123 242/559.1 |
| 7,066,512 | B2* | 6/2006 | Harris ....................... | B66C 1/54 294/63.1 |

(Continued)

*Primary Examiner* — Kaitlin S Joerger
(74) *Attorney, Agent, or Firm* — Don V. Kelly; Evans & Dixon, L.L.C.

(57) ABSTRACT

A suspended tire manipulator for use by an operator in lifting a tire having a mounting aperture includes a first handle attached to a first proximal arm. The first proximal arm is connected to a first distal arm at an obtuse angle. The manipulator includes a rotary balancer pivotally mounted to the first distal arm. The rotary balancer provides a pivoting torque to the first distal arm in response to operator movements raising and lowering the manipulator via manual force applied at the handle. A vertical support has a lower end and an upper end. The lower end connects to the rotary balancer. The manipulator includes a pair of gripper shoes. The pair of gripper shoes are slidably mounted on a rail and move in opposite inboard and outboard directions on the rail.

7 Claims, 8 Drawing Sheets

(56) References Cited

U.S. PATENT DOCUMENTS

| | | | | |
|---|---|---|---|---|
| 7,222,902 B2* | 5/2007 | Slezak | ............... | B66C 1/24 |
| | | | | 294/67.22 |
| 8,661,645 B2* | 3/2014 | Lemser | ............... | B60C 25/138 |
| | | | | 157/1.17 |
| 9,340,401 B2* | 5/2016 | Takeuchi | ............... | B66F 9/185 |
| 9,409,359 B2* | 8/2016 | Thalgott | ............... | B66C 1/54 |
| 10,239,733 B2* | 3/2019 | Belder | ............... | B66C 1/54 |
| 2009/0295179 A1* | 12/2009 | Michaels | ............... | B29D 30/0603 |
| | | | | 294/97 |

* cited by examiner

TIRE MANIPULATOR

CROSS REFERENCE TO RELATED APPLICATION

This application claims the benefit of and incorporates by reference the entirety of U.S. Provisional Patent Application No. 62/610,421 filed on Dec. 26, 2017.

STATEMENT REGARDING FEDERALLY SPONSORED RESEARCH OR DEVELOPMENT

Not applicable.

SEQUENCE LISTING, TABLE OR COMPUTER PROGRAM ON COMPACT DISC

Not applicable.

FIELD OF INVENTION

This invention relates generally to material handling devices and systems and more specifically to a device for lifting and relocating a tire.

BACKGROUND OF THE INVENTION

It is commonplace in both industrial and commercial applications that employees are called upon to move bulky and heavy objects from one location to another. Such tasks present a risk of injury not just to the employees directly involved in the relocation task, but to other employees in the vicinity of the involved employees. In addition, moving bulky objects in the workplace requires dedication of manpower and time resources, which add operating costs to businesses. Tires are an example of a bulky object that poses an injury risk to the employee when being moved from one place to another. The average passenger car tire weighs between 25 and 50 pounds. The average pickup truck tire weighs between 50 and 75 pounds. A tire for a tractor trailer can weigh over 100 pounds.

Tire manufacturers, large-volume tire sellers and motor vehicle manufacturers are examples of businesses whose workers are engaged in extensive lifting of tires. These businesses rely upon specialty devices called tire manipulators to move tires from one location to another. This is especially true for tire manufacturers whose employees must lift and position an individual green tire (the uncured tire product produced by a tire building machine) and cured tires as part of the manufacturing process.

One form of tire manipulator known in the prior art is the pneumatically activated tire manipulator that is suspended from a jib crane or bridge crane. The manipulator is suspended from a trolley that may travel horizontally on an overhead rail on the crane. These suspended manipulators employ pneumatic or electric powered lifting systems to allow operators to raise and lower a held heavy object like a tire. The manipulator has handles held by the operator and the manipulator acts as an extension of the operator's hands. The operator transfers the tire from one position to another by depressing thumb levers located on the operator handles to attach and release the tire and to raise and lower the manipulator in conjunction with the operator's movements.

Figure 1:
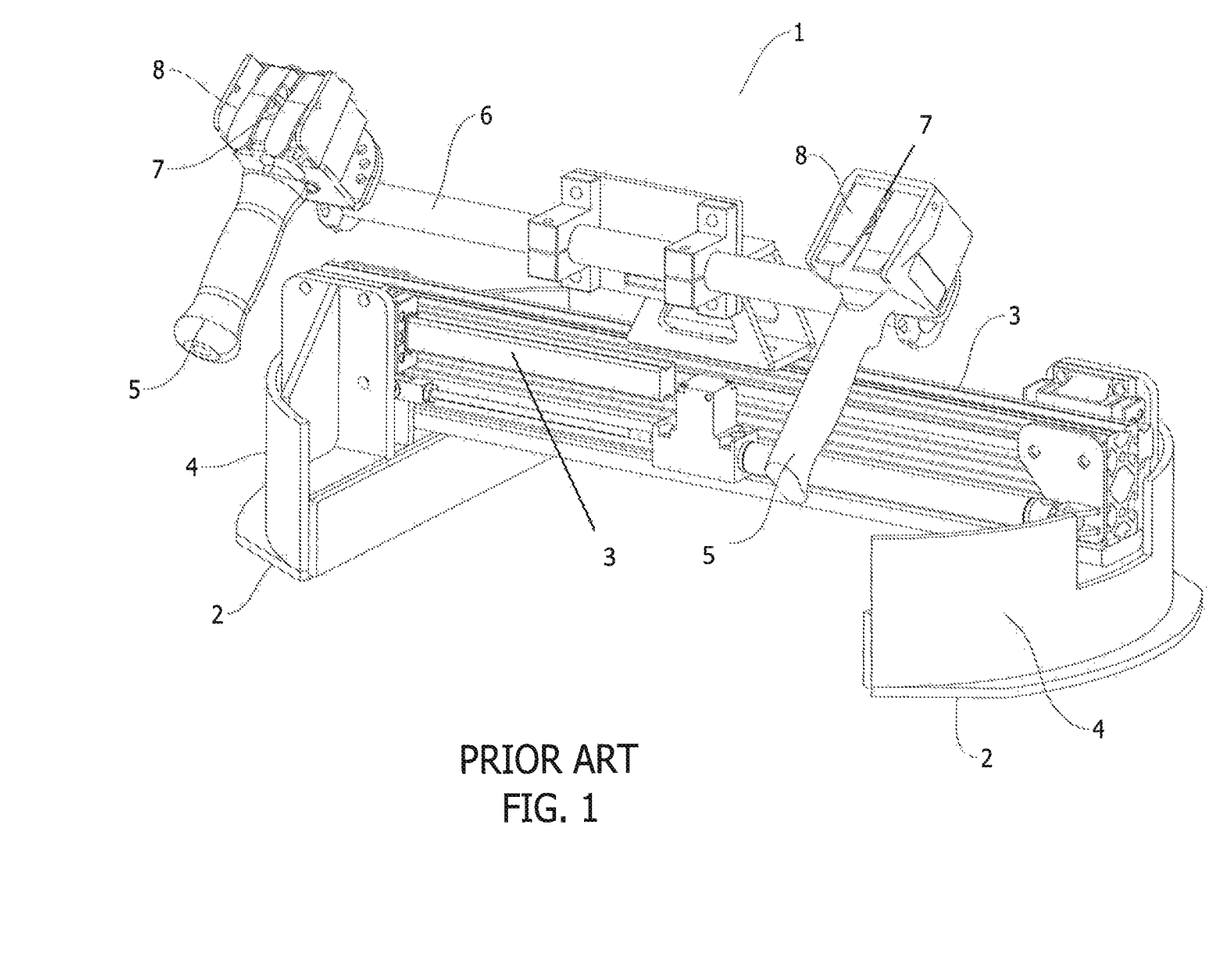
FIG. 1 is a perspective view of a prior art tire manipulator.
Figure 2:
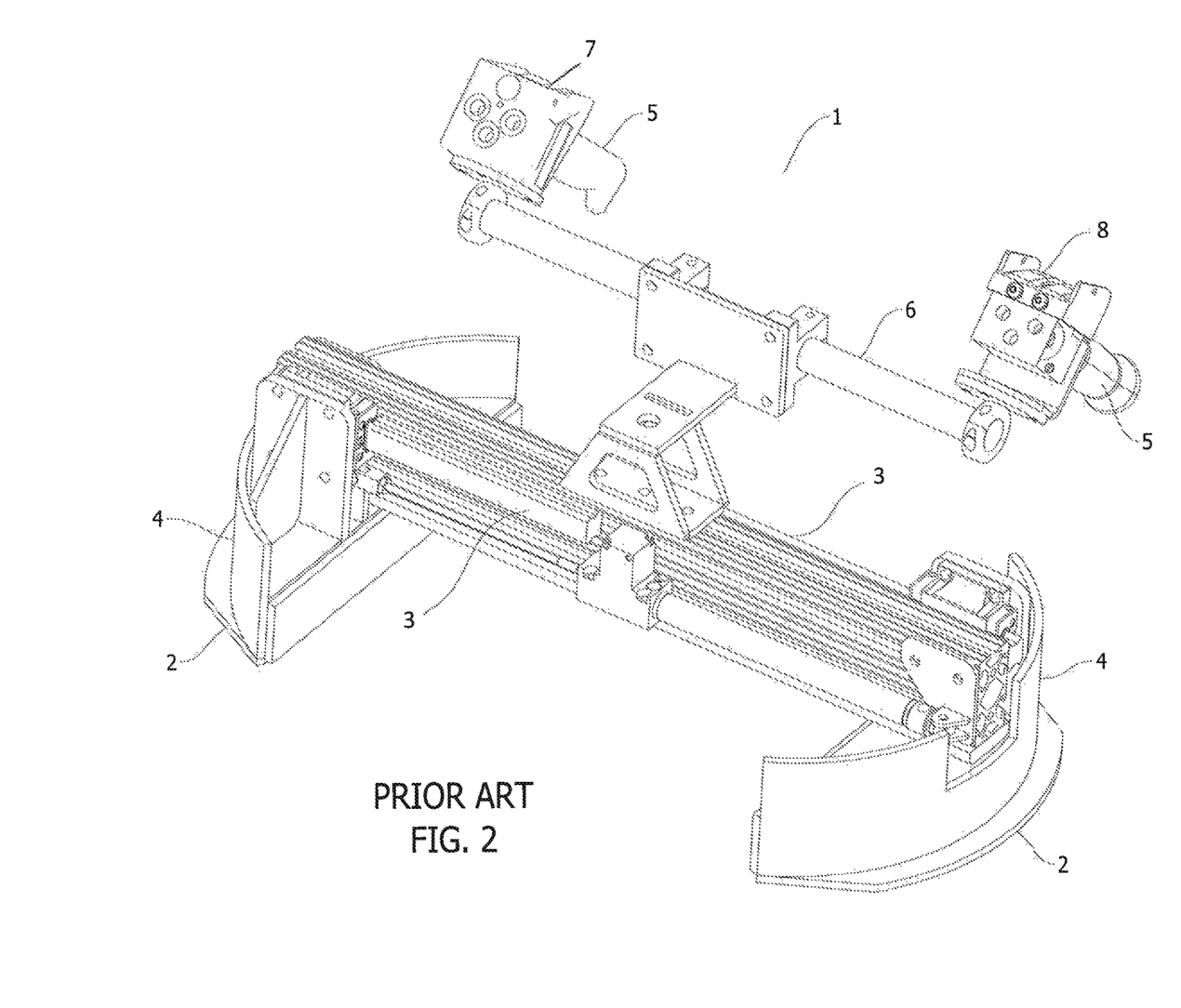
FIG. 2 is an alternate perspective view of a prior art tire manipulator.
Figure 3:
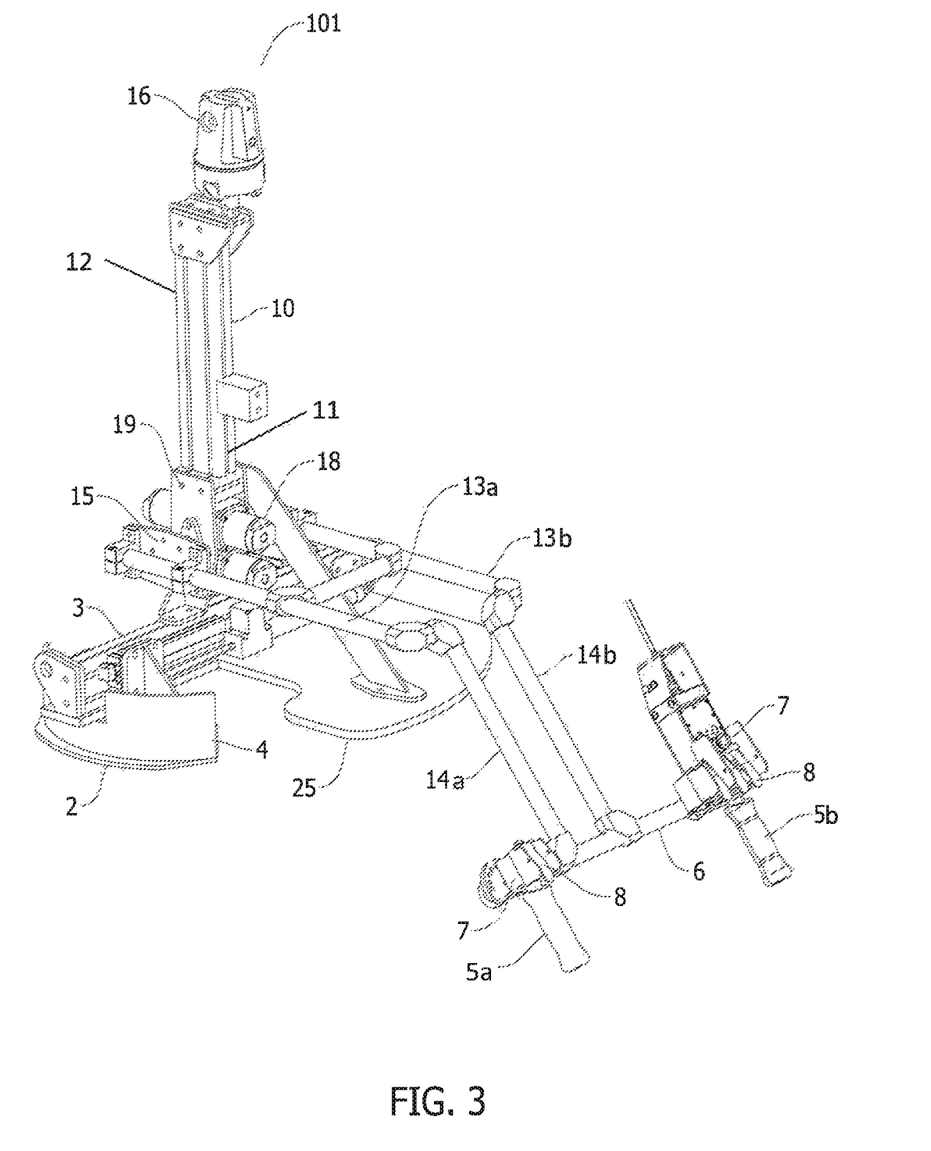
FIG. 3 is a perspective view of a preferred embodiment of the present invention tire manipulator.
Figure 4:
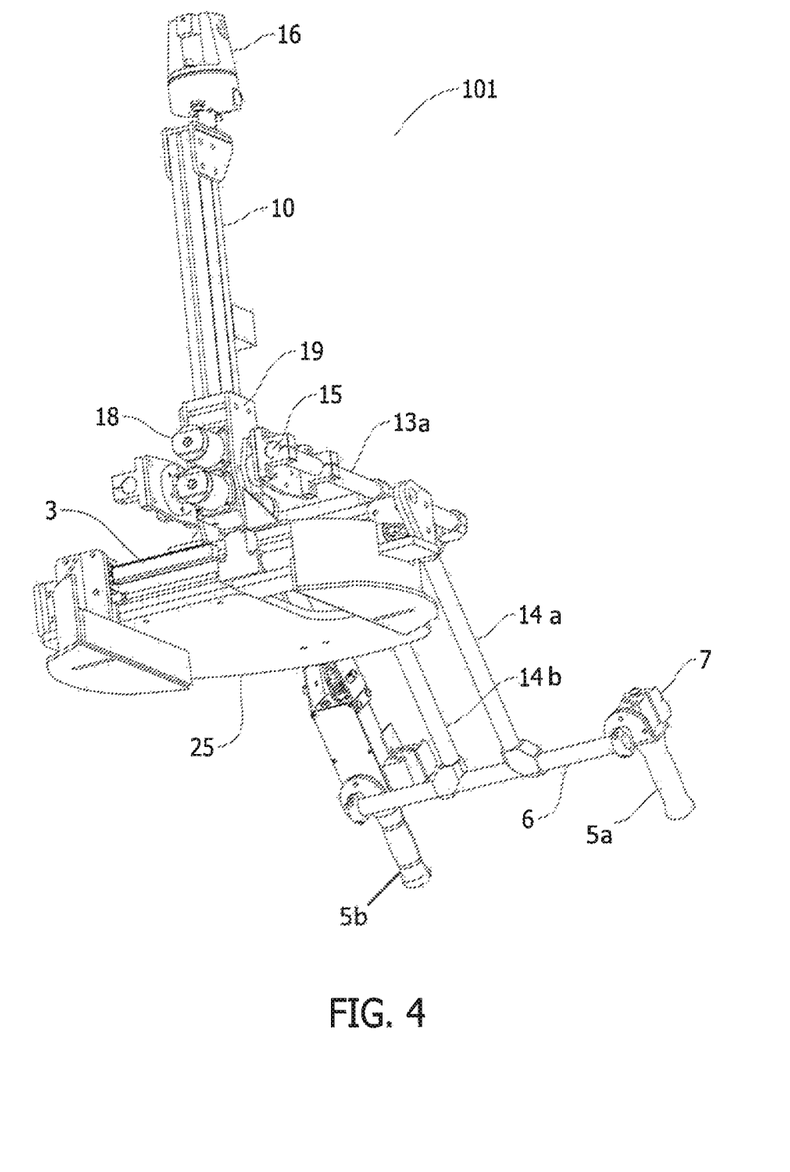
FIG. 4 is an alternate perspective view of the preferred embodiment of the present invention tire manipulator.
Figure 5:
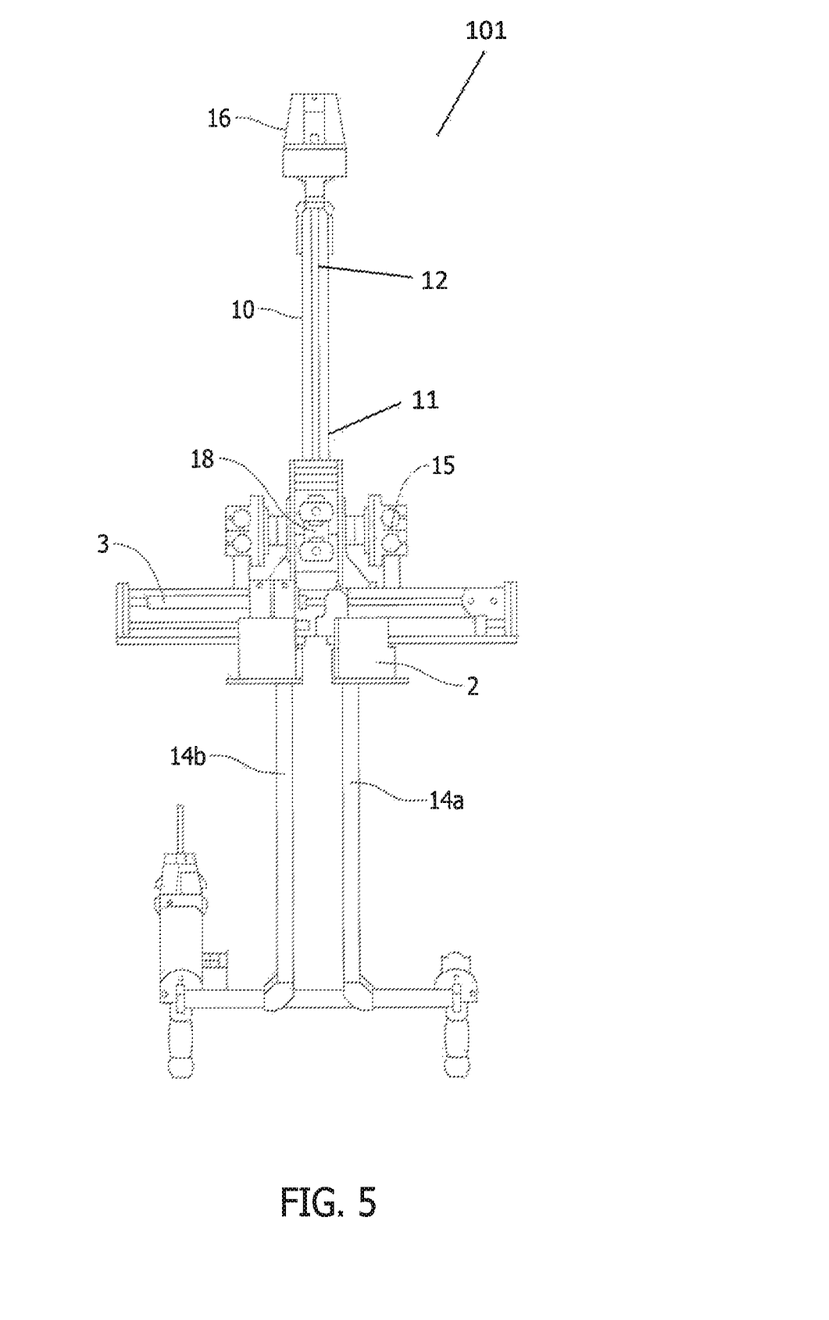
FIG. 5 is a front elevation view of the preferred embodiment of the present invention tire manipulator.

FIGS. 1 and 2 depict a prior art tire manipulator 1. As shown in these figures, prior art tire manipulator 1 comprises a pair of gripper shoes 2 slidably mounted upon rail 3. In the typical arrangement, tire manipulator 1 would be suspended from a jib crane or bridge crane and pneumatically activated. Gripper shoes 2 have an arcuate perimeter surface 4 that has a radial curvature adapted to complementarily engage the inner radial surface of a tire. Gripper shoes 2 move radially inwardly and outwardly on rail 3.

In use, a user would hold handles 5 situated outwardly on handlebar 6. While holding onto the handles 5 the user can move manipulator 1 horizontally by manually pushing/pulling on handles 5. Raise and lower motions are effected by depressing thumb levers 8 on control panel 7 located on operator handle 5. The inward and outward movement of gripper shoes 2 on rail 3 is likewise controlled by the user via thumb levers 8 on control panel 7 on handles 5. To relocate a tire, gripper shoes 2 would be brought to their inboard position on rail 3, manipulator 1 would be positioned vertically over the tire and manipulator 1 would be lowered such that shoes 2 would be inserted into the cavity of the tire. Once fully inserted into the cavity, the user would cause the outward movement of shoes 2 on rail 3 until the shoes securely pressed against the inner radial surface of the tire (a/k/a the tire's bead). Once that pressure contact is achieved, the user could then initiate lifting movement to the manipulator through levers 8 on panel 7 and thereby lift and reposition the tire. Once repositioned, the user would bring shoes 2 inboard, thereby releasing the tire from the manipulator.

There are several features of the prior art tire manipulator that can be improved. In one regard, it is a common task in certain tire handling jobs to pick a tire from a conveyor height of 36 inches and place the tire on a cart. When stacking tires on a cart, the operator manipulating the tire may need to position the tire at a stack height ranging from 12 inches to 72 inches. Because of the design of the prior art tire manipulator, for an operator to position a tire throughout this height range, the handles need to effectively travel up and down to these same elevations. Thus, with the prior art tire manipulator, the fixed position handles do not allow an operator to comfortably and effectively use and control the manipulator tool. There is thus a need in the art for a tire manipulator that is more easily and comfortably usable.

SUMMARY OF THE INVENTION

The present invention overcomes the stated deficits in the prior art and provides for an improved tire manipulator that is easier and more comfortable to use. In one embodiment, the present invention is directed to a suspended tire manipulator for use by an operator in lifting a tire having a mounting aperture. The manipulator comprises a first handle and a second handle. The first handle and second handle are respectively connected to a first proximal arm and second proximal arm, preferably via a handlebar. The handles are preferably connected at a fixed orientation relative to the proximal arms. The first proximal arm and second proximal arm are preferably respectively connected at a fixed obtuse angle to a first distal arm and second distal arm.

The preferred embodiment manipulator includes a rotary balancer pivotally mounted to the first distal arm and second distal arm. The rotary balancer applies a pivoting torque to the first distal arm and second distal arm which the operator will feel in response to his or her movements raising and lowering the manipulator via force applied at the handles. The manipulator includes a vertical support having a lower end and an upper end. The lower end of the vertical support connects to the rotary balancer. The upper end of the vertical support includes a connector for suspending the tire manipulator from an arm, jib, crane, rail, beam or other elevated support. Preferably the connector is a suspension swivel. The manipulator includes a rail and a pair of gripper shoes. Each gripper shoe preferably has a convex arcuate perimeter surface. The pair of gripper shoes are slidably mounted on the rail and are configured to move in opposite inboard and outboard directions on the rail. In a preferred embodiment, the tire manipulator includes a balance plate mounted to the tire manipulator below the first distal arm and second distal arm. In a more preferred embodiment the balance plate is clear.

DETAILED DESCRIPTION

The present disclosure provides an apparatus and system to reduce or eliminate the safety and ergonomic drawbacks of using the prior art tire manipulator to reposition a tire and provides for the efficient and safe manipulation of tires. Unless otherwise defined, all terms (including mechanical, technical, and scientific terms) used herein have the same meaning as commonly understood by one of ordinary skill in the art to which this present disclosure belongs. It will be further understood that terms used herein should be interpreted as having a meaning that is consistent with their meaning in the context of this specification and the relevant art and will not be interpreted in an idealized or overly formal sense unless expressly so defined herein. It will be understood that, terms such as first, second, etc. may be used herein to describe various elements or configurations, these elements or configurations should not be limited by these terms. These terms are only used to distinguish one element or configuration from another, for example, a first element or configuration could be termed a second element or configuration, and, similarly, a second element or configuration could be termed a first element or configuration, without departing from the scope of the present disclosure. Additionally, unless otherwise indicated, terms such as "connect" or "attach" include direct and indirect connection and attachment methods.

FIGS. 3-8 depict embodiments of a present invention tire manipulator 101 along with its preferred features. As is seen in the figures, the inventive tire manipulator 101 includes a pair of gripper shoes 2 slidably mounted upon rail 3. Tire manipulator 101 is suspended in the known manner from a jib or bridge crane (not shown) via suspension swivel 16 on vertical support 10 and is pneumatically activated. Gripper shoes 2 have a convex arcuate perimeter surface 4 that has a radial curvature adapted to complementarily engage the inner radial surface of a tire 20. Gripper shoes 2 move radially inwardly and outwardly on rail 3. In basic description, the inventive manipulator has one or more handles 5a, 5b each respectively connected to a proximal arm 14a, 14b. Each proximal arm 14a, 14b is respectively connected to a distal arm 13a, 13b at an obtuse angle. The distal arm 13a, 13b is pivotally connected to a rotary balancer 18 attached to the lower end 11 of vertical support 10. The preferred embodiment version of the manipulator employs two handles 5a, 5b that respectively connect to proximal arms 14a, 14b, which in turn respectively connect at an obtuse angle to distal arms 13a, 13b. Each of distal arms 13a, 13b are pivotably connected at their other ends to rotary balancer 18.

In use, a user would hold first and second handles 5a, 5b of tire manipulator 101 that are respectively situated outwardly on proximal arms 14a, 14b, preferably via handlebar 6. Handles 5a, 5b preferably indirectly connect to proximal arms 14a, 14b either through individual short handlebars or via the unitary long handlebar 6 as shown in the figures. Handles 5a, 5b preferably have a fixed orientation with respect to proximal arms 14a, 14b. In the preferred embodiment, the orientation of handles 5a, 5b is generally parallel (−5 degrees to +5 degrees) to the orientation of proximal arms 14a, 14b. In the exemplary embodiment in the figures, handles 5a, 5b each connect to a unitary handlebar 6, which in turn connects to both proximal arms 14a, 14b. While holding onto the handles 5a, 5b the user can move manipulator 101 horizontally by manually pushing and pulling on handles 5a, 5b. Raise and lower motions are effected by depressing thumb levers 8 located on control panel 7, preferably on handle 5b. The inward and outward movement of gripper shoes 2 on rail 3 is likewise controlled by the user via thumb levers 8 on control panel 7 preferably located on handle 5a. The weight of the handle is offset via a pressure regulator directing compressed air into the pneumatic rotary balancer 18; the regulator is adjusted so as to make the handle weightless in the operator's hands. To relocate a tire, gripper shoes 2 would be brought to their inboard position on rail 3, manipulator 101 would be positioned vertically over the tire and manipulator 101 would be lowered such that shoes 2 would be inserted into the cavity of the tire 20. Once fully inserted into the cavity, the user, using the controller buttons on panel 7 would cause the outward movement of shoes 2 on rail 3 until shoes 2 securely press against the inner radial surface 22 of the tire (a/k/a the tire's bead). Once that pressure contact is achieved, the user could then apply lifting movement to manipulator 101 through handle 5b and thereby lift and reposition tire 20. Once repositioned, the user would bring shoes 2 inboard, thereby releasing tire 20 from manipulator 101.

Figure 6:
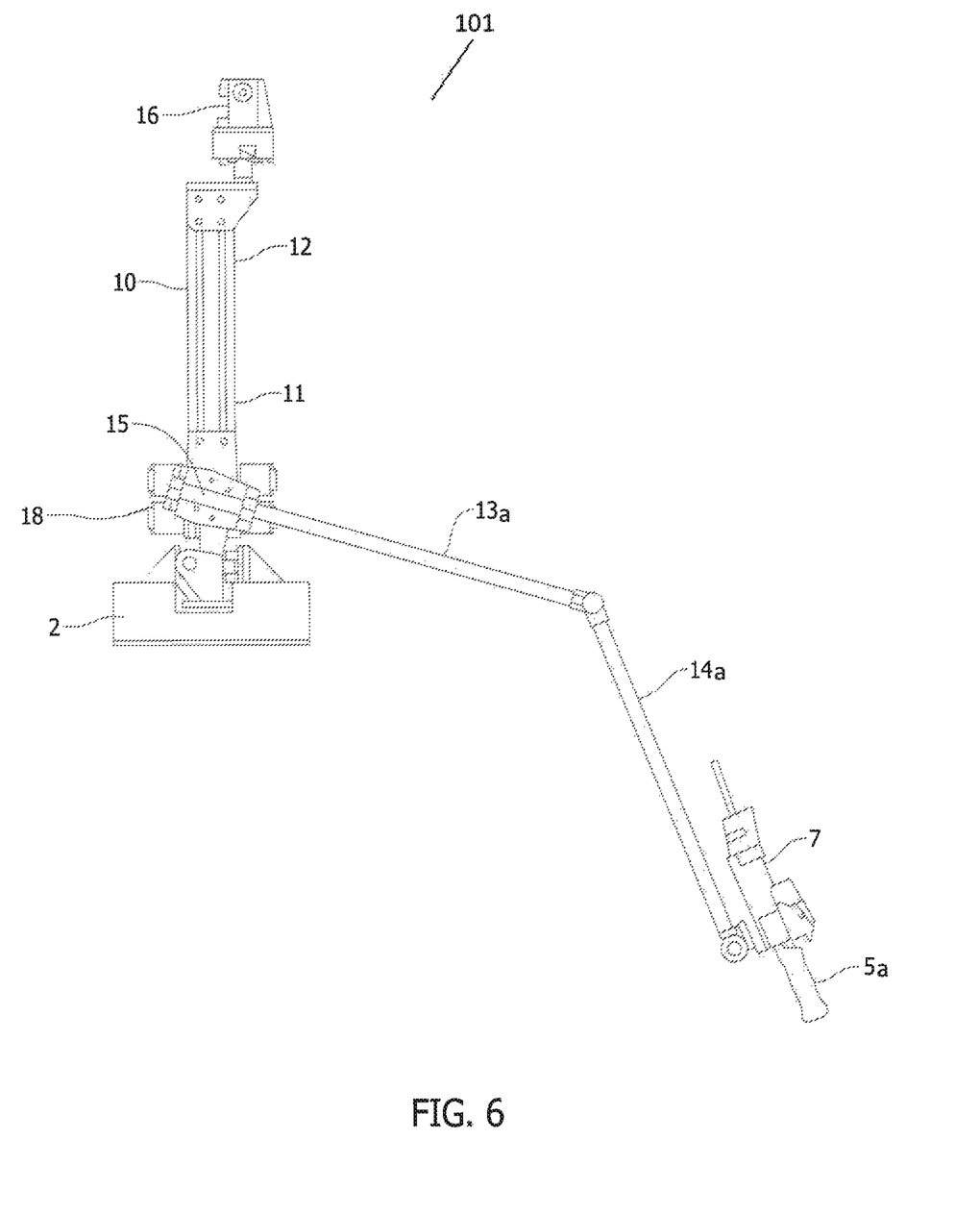
FIG. 6 is a side elevation view of an embodiment of the tire manipulator of the present invention with the handles in a low position.
Figure 7:
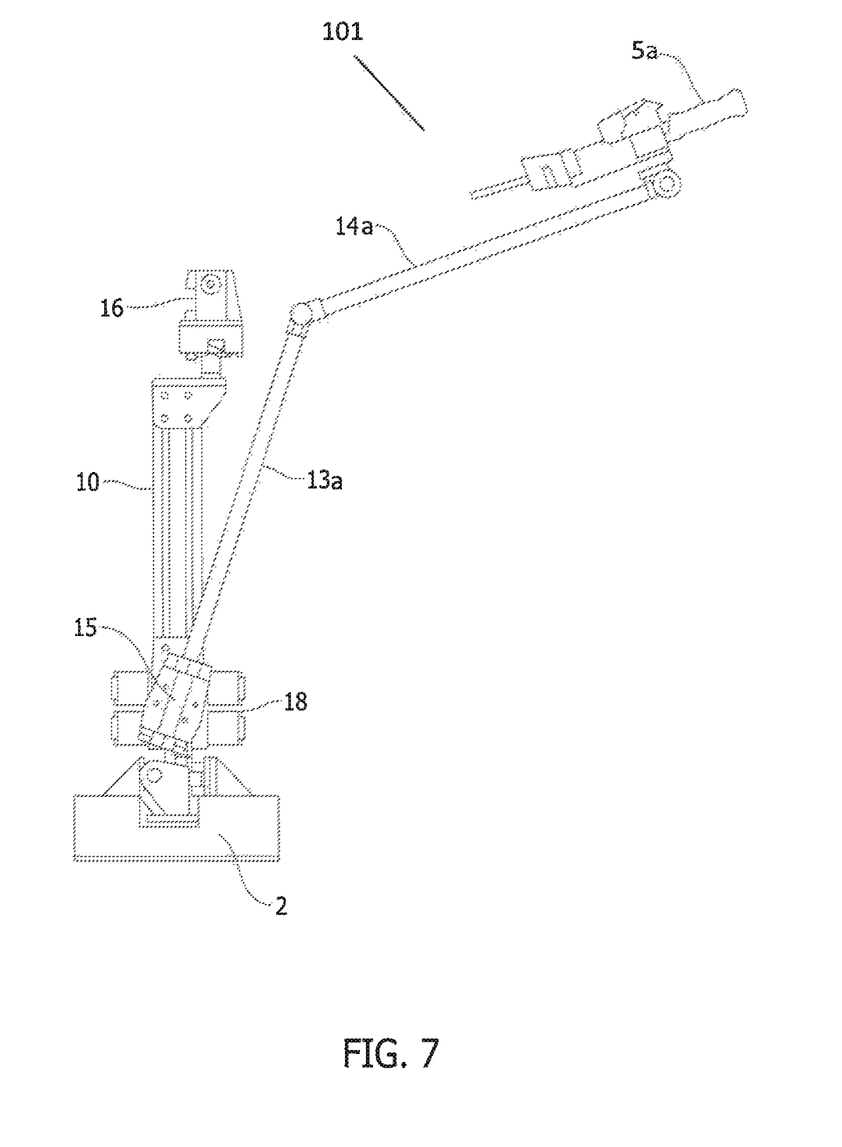
FIG. 7 is a side elevation view of an embodiment of the tire manipulator of the present invention with the handles in a high position.
Figure 8:
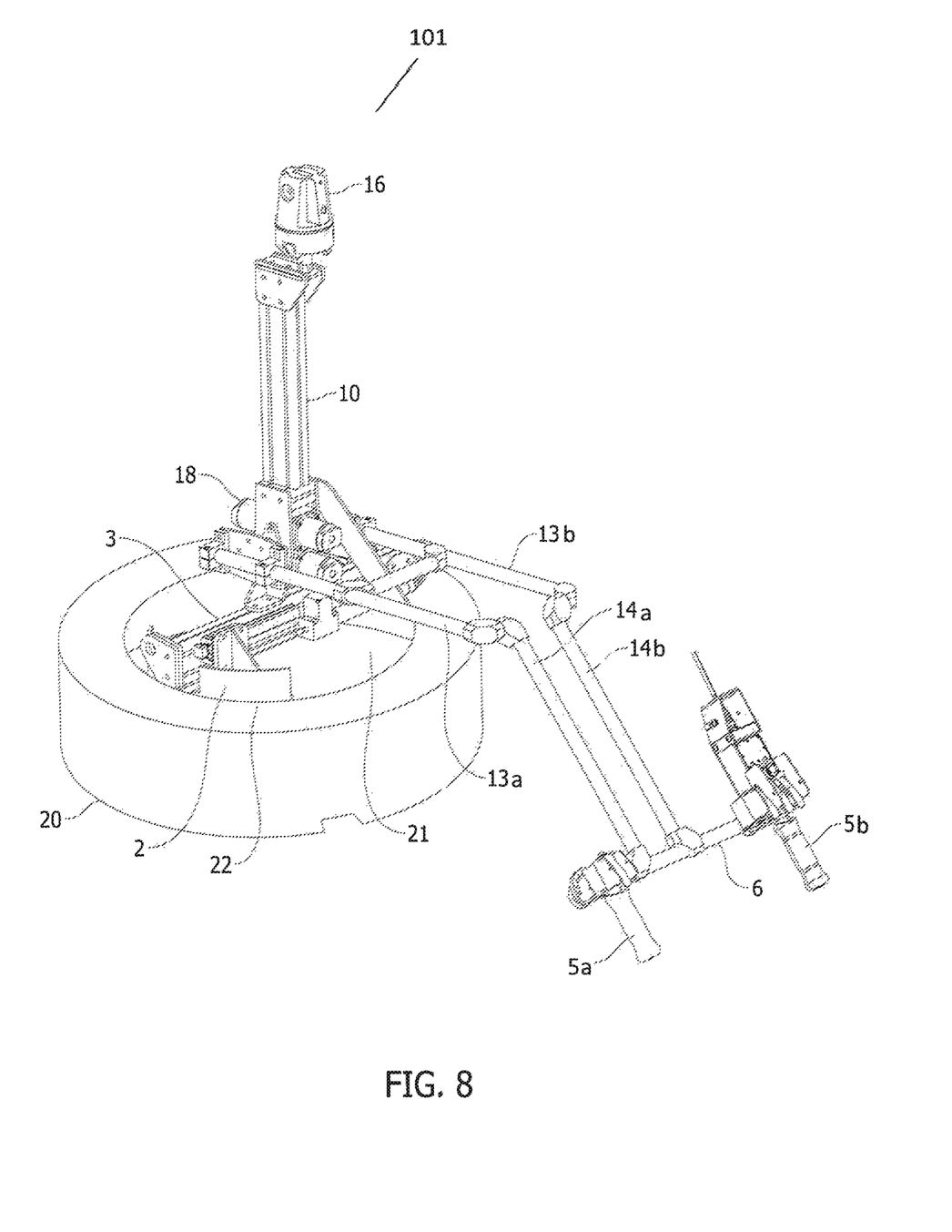
FIG. 8 is a perspective view of an embodiment of the tire manipulator of the present invention shown holding a tire.

In practical use, tire manipulator 101 will normally be suspended vertically from a jib or bridge crane considered vertical in reference to the operator. Thus, the directional terms "vertical" and "horizontal" and the like are used to describe the tire manipulator 101 and its components with respect to the orientation illustrated in FIGS. 3-8 and are employed merely for the purposes of clarity and illustration. For example, FIG. 6 shows tire manipulator 101 when vertical support 10 of tire manipulator 101 is suspended perpendicularly to the floor (not shown) on which an operator would stand. In the orientation shown in FIG. 6, vertical support 10 depends "vertically" downward and distal arms 13a, 13b project horizontally and downwardly from their pivot point 15 with rotary balancer 18. Thus, with regard to the orientations shown in the figures, terms "vertical" and "vertically" mean a direction generally normal to or away from the floor surface on which an operator would stand in operating the tire manipulator. The terms "horizontal" and "horizontally" mean a direction generally parallel to that of the floor. The directional terms "proximal" and "distal" and the like are used herein with respect to the described tire manipulator to refer to positions and locations on the tire manipulator relative to handles 5a, 5b. Thus, relative terms such as "below" or "above" or "upper" or "lower" or "horizontal" or "vertical" may be used herein to describe a relationship of one element to another element, or relative motion of elements, for example, as illustrated in the figures. It will be understood that these terms are intended to encompass different orientations and motion of the apparatus in addition to the orientation depicted in the figures and are not intended to limit the present disclosure in any way.

The terminology used herein is for the purpose of describing particular embodiments only and is not intended to be limiting in any way. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features steps, operations, elements, and/or components, but do not preclude the presence or addition of one or more other features, steps, operations, elements, components, and/or groups thereof.

Embodiments of the present disclosure will now be described more fully hereinafter with reference to the accompanying drawings, in which the embodiments are shown. This present disclosure may, however, be embodied in many different forms and should not be construed as limited to the embodiments set forth in the drawings. Rather, these embodiments are provided so that this disclosure will be thorough and complete, and will fully convey the scope of the invention to those skilled in the art. Like numbers refer to like elements throughout.

In one embodiment the present invention is directed to a tire manipulator 101 for use by an operator in lifting a tire 20 having a mounting aperture 21 typically defined by a tire bead 22 (tire bead 22 constituting the afore-mentioned inner radial surface). Embodiment tire manipulator 101 comprises a pair of handles 5a, 5b respectively connected to first proximal arm 14a and second proximal arm 14b. Preferably, handles 5a, 5b connect to first and second proximal arms 14a, 14b via handlebar 6. Handlebar 6 connects to proximal arms 14a, 14b and provides rigidity to proximal arms 14a, 14b and thus allow for better control of tire manipulator 101. Handles 5a, 5b preferably have a fixed orientation with respect to proximal arms 14a, 14b. In the preferred embodiment, the orientation of handles 5a, 5b is generally parallel (−5 degrees to +5 degrees) to the orientation of proximal arms 14a, 14b. First and second proximal arms 14a, 14b respectively connect at a fixed angle to a first distal arm 13a and second distal arm 13b. The preferred angle of connection is an obtuse angle in the range of 130-150 degrees. In an alternate embodiment the angle of connection between the proximal arms and the distal arms may be adjustable.

Rotary balancer 18 is pivotally mounted to first distal arm 13a and second distal arm 13b. Rotary balancer 18 is preferably pneumatically powered. Rotary balancer 18 pivotally moves first distal arm 13a and second distal arm 13b in response to operator movements raising and lowering manipulator 101 via manual force applied at handles 5a, 5b. Vertical support 10 has a lower end 11 and an upper end 12. Upper end 12 connects to suspension swivel 16 or other structure or device that allows vertical support 10 to be hung from an overhead support. Lower end 11 connects to or has incorporated into it rotary balancer 18. Tire manipulator further includes a pair of gripper shoes 2. Each shoe 2 preferably has a convex arcuate perimeter surface 4. The pair of gripper shoes 2 are slidably mounted on rail 3 and are configured to move in opposite inboard and outboard directions on rail 3. In a preferred embodiment, rail 3 connects to lower end 11 of vertical support 10 via frame 19. Frame 19 also holds rotary balancer 18 to which are pivotably connected first distal arm 13a and second distal arm 13b. Rail 3 is connected to lower end 11 of vertical support 10 below the pivotal connection point of first and second distal arms 13a, 13b to rotary balancer 18. Tire manipulator 101 further preferably includes balance plate 25 mounted to the tire manipulator. The preferred mounting location of balance plate 25 is below first distal arm 13a and second distal arm 13b. In the preferred embodiment, balance plate 25 is clear.

The present invention tire manipulator 101 allows an operator to safely and comfortably pick a tire 20 from a 36-inch high conveyor and place it at repositioned height of 12 inches to 72 inches. By virtue of the rigid angular connection between distal arms 13a, 13b and proximal arms 14a, 14b instead of the short fixed arms of the prior art tire manipulator, an operator can effectively use and control manipulator 101 through manual force applied at handles 5a, 5b and move the tire manipulator 101 with an onboard tire 20 up and down to these elevations. The angle of connection between arms 13a, 13b and arms 14a, 14b keep handle 5a, 5b elevations in a desirable ergonomic range, which is the range generally from the operator's waist to chest.

With the prior art tire manipulator 1 the operator is required to hold the weight of the handles. The weight of the handles is heavy, resulting in the manipulator operation not being user friendly. The present invention eliminates this deficit by coupling the handle pivoting structure (distal arms 13a, 13b) to pneumatic rotary balancer 18. Pneumatic regulation is used to apply and adjust pressure to pneumatic rotary balancer 18 and thus a lifting force to distal arms 13a, 13b as needed to balance the handle weight. Such pneumatic regulation effectively makes the tool weightless in the operator's hands throughout the vertical travel of the tooling.

As shown in the figures, the inventive tire manipulator preferably includes balance plate 25, which is preferably clear to allow an operator to visually locate and position shoes 2 in the center of tire cavity 21. When pivotally coupled to distal arms 13a, 13b, pneumatic rotary balancer 18 applies a torque and roll over tendency to the manipulator 101 when balancing the weight of arms 13a, 13b, 14a, 14b, handlebar 6 and handles 5a, 5b. This torque manifests when the operator positions shoes 2 of tire manipulator 101 into cavity 21 of tire 20 and brings tire manipulator 101 into contact with tire 20 during the pick-up operation. In this regard, the rotary balancing force will cause vertical member 10 to pitch back with the lower end 11 of vertical member 10 moving towards the operator. This is undesirable and the roll over tendency needs to be reduced. The present invention tire manipulator eliminates this roll over tendency via the inclusion of balance plate 25. Plate 25 is preferably transparent to allow the operator to see the center cavity of the tire for proper placement of the tooling during the pick operation.

The foregoing description describes the inventive tire manipulator 101 in its preferred embodiment form. However, as is evident from the figures and described in terms of the "first" structures, the inventive manipulator can be constructed in a more basic form having only one distal arm 13a attached at a rigid angular connection to one proximal arm 14a. The angle of connection is preferably as described above for the embodiment having two proximal arms and two distal arms. The angle of connection is rigid, but may be adjustable. A suspended tire manipulator 101 of this construct would comprise a first handle 5a connected at a fixed orientation to a first proximal arm 14a. Though fixed, the orientation may be adjustable. First proximal arm 14a connects at an angle to first distal arm 13a. The preferred angle of connection is an obtuse angle preferably in the range of 130-150 degrees. A rotary balancer 18 is pivotally mounted to first distal arm 13a. Rotary balancer 18 applies a pivoting torque to first distal arm 13a in response to operator movement raising or lowering the manipulator 101 via manual force applied at the handle 5a. The basic manipulator 101 includes vertical support 10 having a lower end 11 and an upper end 12. Lower end 11 connects to rotary balancer 18. The manipulator 101 includes a pair of gripper shoes 2. The pair of gripper shoes 2 are slidably mounted on rail 3 and are configured to move in opposite inboard and outboard directions on rail 3. Rail 3 is connected to lower end 11 of vertical support 10 below the pivotal connection point of first distal arm 13a. to rotary balancer 18. The basic version of the tire manipulator 101 can include balance plate 25 mounted to tire manipulator 101 below first distal arm 13a.

The above has been described both generically and with regard to specific embodiments of the inventive tire manipulator. Although the present disclosure has been set forth in what is believed to be the preferred embodiments, a wide variety of alternatives known to those of skill in the art can be selected within the generic disclosure. For example, in an alternate embodiment tire manipulator could include a unitary beam connecting distal arms 13a, 13b to handles 5a, 5b in place of parallel proximal arms 14a, 14b. Alternatively, rather than being operable through a dual handle configuration, the tire manipulator could be adapted for one-hand operation using a single handle control module. Other advantages and obvious modifications of the present disclosure will be apparent to the artisan from the above description and further through practice of the present disclosure.

What is claimed is:

1. A suspended tire manipulator for use by an operator in lifting a tire having a mounting aperture, the manipulator comprising:
   a first handle connected to a first proximal arm;
   the first proximal arm connected at an obtuse angle to a first distal arm;
   a rotary balancer pivotally mounted to the first distal arm, the rotary balancer applying a pivoting torque to the first distal arm;
   a vertical support having a lower end and an upper end, the lower end connecting to the rotary balancer;
   a pair of gripper shoes;
   the pair of gripper shoes slidably mounted on a rail and moving in opposite inboard and outboard directions on the rail;
   the rail connected to the lower end of the vertical support; and
   a balance plate mounted to the tire manipulator below the first distal arm.

2. The tire manipulator of claim 1 wherein the balance plate is clear.

3. A suspended tire manipulator for use by an operator in lifting a tire having a mounting aperture, the manipulator comprising:
   a first handle connected to a first proximal arm and a second handle connected to a second proximal arm;
   the first proximal arm and second proximal arm respectively connected at an obtuse angle to a first distal arm and second distal arm;
   a rotary balancer pivotally mounted to the first distal arm and second distal arm, the rotary balancer applying a pivoting torque to the first distal arm and second distal arm;
   a vertical support having a lower end and an upper end, the lower end connecting to the rotary balancer;
   a pair of gripper shoes;
   the pair of gripper shoes slidably mounted on a rail and moving in opposite inboard and outboard directions on the rail; and
   the rail connected to the lower end of the vertical support.

4. The tire manipulator of claim 3 further including a balance plate mounted to the tire manipulator below the first distal arm and second distal arm.

5. The tire manipulator of claim 4 wherein the balance plate is clear.

6. The tire manipulator of claim 4 wherein the pair of handles is connected to the first proximal arm and second proximal arm via a handlebar extending from the first proximal arm and second proximal arm.

7. The tire manipulator of claim 4 where one or more of the shoes has an arcuate perimeter surface.

* * * * *